United States Patent
Ikavalko et al.

(10) Patent No.: US 9,165,065 B2
(45) Date of Patent: Oct. 20, 2015

(54) TERMINOLOGY MANAGEMENT DATABASE

(75) Inventors: Karin Andrea Ikavalko, San Jose, CA (US); Grahame Andrew Jastrebski, San Jose, CA (US)

(73) Assignee: Paypal Inc., San Jose, CA (US)

( * ) Notice: Subject to any disclaimer, the term of this patent is extended or adjusted under 35 U.S.C. 154(b) by 289 days.

(21) Appl. No.: 12/748,045

(22) Filed: Mar. 26, 2010

(65) Prior Publication Data

US 2011/0238584 A1    Sep. 29, 2011

(51) Int. Cl.
G06F 7/00 (2006.01)
G06F 17/30 (2006.01)
G06Q 50/18 (2012.01)

(52) U.S. Cl.
CPC ........ *G06F 17/30737* (2013.01); *G06Q 50/184* (2013.01)

(58) Field of Classification Search
None
See application file for complete search history.

(56) References Cited

U.S. PATENT DOCUMENTS

| | | | |
|---|---|---|---|
| 6,144,958 A * | 11/2000 | Ortega et al. | 1/1 |
| 6,401,084 B1 * | 6/2002 | Ortega et al. | 707/706 |
| 6,424,983 B1 * | 7/2002 | Schabes et al. | 715/257 |
| 6,632,251 B1 * | 10/2003 | Rutten et al. | 715/205 |
| 6,978,275 B2 * | 12/2005 | Castellanos et al. | 1/1 |
| 7,461,059 B2 * | 12/2008 | Richardson et al. | 1/1 |
| 7,953,746 B1 * | 5/2011 | Garg et al. | 707/762 |
| 2005/0198068 A1 * | 9/2005 | Mukherjee et al. | 707/104.1 |
| 2006/0047629 A1 * | 3/2006 | Gabbert et al. | 707/2 |
| 2006/0047689 A1 * | 3/2006 | Gabbert et al. | 707/102 |
| 2006/0253427 A1 * | 11/2006 | Wu et al. | 707/3 |
| 2011/0213808 A1 * | 9/2011 | Rheaume | 707/802 |

OTHER PUBLICATIONS

Moreno et al., "Reusing the Mikrokosmos Ontology for Concept-Based Multilingual Terminology Databases", Proceedings of the 2nd International Conference on Language Resources and Evaluation, 2000, pp. 1061-1067.*
Liu et al., "Automated Suggestions for Miscollocations", Proceedings of the NAACL HLT Workshop on Innovative Use of NLP for Building Educational Applications, pp. 47-50, Jun. 2009, Association for Computational Linguistics.*
Plovnick et al., Reformulation of Consumer Health Queries and Professional Terminology: A Pilot Study, J Med Internet Res, 6(3), e27, Jul.-Sep. 2004, JMIR Publications.*
Rinaldi et al., "Exploiting Technical Terminology for Knowledge Management", Proceedings of the 14th International Conference of EKAW, 2004.*
Braslavski et al., "ProThes: Thesaurus-based Meta-Search Engine for a Specific Application Domain", WWW 2004, pp. 222-223, 2004, ACM.*
Schmidt-Wigger, "Building Consistent Terminologies", Proceedings of COMPUTERM'98, 1998.*
Carl et al., "The TETRIS Terminology Tool Michael", TAL, vol. 43, No. 1, pp. 73-102, 2002.*

* cited by examiner

*Primary Examiner* — Michael Hicks
(74) *Attorney, Agent, or Firm* — Haynes & Boone, LLP

(57) ABSTRACT

Various methods and systems are provided to allow different users to search for company-specific terms in a terminology database maintained by a company or website. Information about the terminology provided to the user may include acceptability of use, details of acceptable or unacceptable use, description, synonyms, and related terms. Terms not found in the database may be added from a submission by the user. As a result, users may better understand terminology used by the company or website. In other embodiments, terminology can be searched for acceptable use in social networking sites or other areas or searched for plagiarism.

24 Claims, 5 Drawing Sheets

106 — 104 ✓ cash — 102 ← 100

Usage: OK to use

In most cases, use money, funds, or payment as a substitute for cash.

108

For legal reasons, do not use the word cash unless you are referring explicitly to the physical currency. The only three acceptable uses of cash are:

Usage Notes:
- For U.S.-only: "You've got cash!"
- Any reference to taking cash from ATMs: "Get cash from your PayPal account from any ATM."
- When messaging different payment or billing options: "This purchase was made by cash, check, or credit card." Or "You'll receive a copy of the cash receipt, canceled check, or statement."

110

112 — Description: None
Notes: None
114 — Related Terms: None
Synonyms: None
116

104 ✓ cash back — 102

Usage: OK to use
Usage Notes: Always 2 words.
Description: None
Notes: None
Related Terms: None
Synonyms: cashback — 118

104 ✗ cashback — 102

Usage: Do not use
Usage Notes: Use cash back (2 words) instead.
Description: None
Notes: None
Related Terms: None
Synonyms: cash back

*FIG. 1A*

Here are terms *containing* 'verification'                                  120

106                         104           102

✕ <u>address verification</u>

Usage:        Do not use

Usage Notes:  Use <u>confirm your address</u> instead

108

Description:   This term has been used to describe the process we use to confirm
                       an address. However, it should not be used because it's jargon and
110                   because it could be confused with the process we use to verify accounts.

Notes:        None

114 — Related Terms:  <u>confirm</u>

Synonyms:    <u>confirm your address</u>

Here are terms *containing* 'BML'                                  122

✕ <u>BML</u>

Usage:        Do not use
Usage Notes:  Use <u>Bill Me Later</u>
Description:   Firm bought by eBay in 2008, providing transactional credit for PayPal purchases.
Notes:        None
Related Terms:  None
Synonyms:    <u>Bill Me Later</u>

Sorry, no matches for 'verify.'
<u>Add your term</u> to Lingo!

*FIG. 1D*

Here are terms *containing* 'federal tax'  ⟵ 200

❌ <u>federal tax ID</u>

Usage: Do not use

Usage Notes: None

Description: A generic way to refer to <u>Employer Identification Number,</u> which is used to identify a business entity in the U.S., but either use the specific name, or use the more general term, tax ID number, which covers both personal and business IDs.

Notes: None

Related Terms: <u>EIN,</u> <u>Employer Identification Number</u>

Synonyms: <u>Employer Identification Number</u>

*FIG. 2*

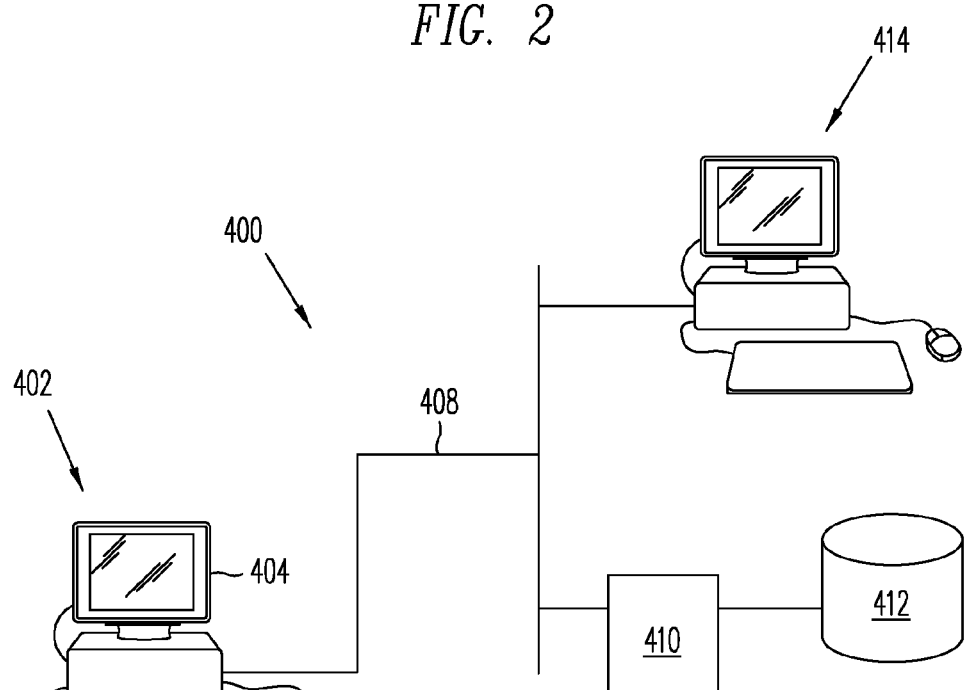

*FIG. 4*

Here are terms *starting with* 'F'

✓ FAQs — 300

| | |
|---|---|
| Usage: | OK to use |
| Usage Notes: | FAQs is acceptable in all uses. |
| Description: | Acronym for Frequently Asked Questions. |
| Notes: | None |
| Related Terms: | None |
| Synonyms: | Frequently Asked Questions |

✗ federal tax ID

| | |
|---|---|
| Usage: | Do not use |
| Usage Notes: | None |
| Description: | A generic way to refer to Employer Identification Number, which is used to identify a business entity in the U.S., but either use the specific name, or use the more general term, tax ID number, which covers both personal and business IDs. |
| Notes: | None |
| Related Terms: | EIN, Employer Identification Number |
| Synonyms: | Employer Identification Number |

⚠ FMF — 302

| | |
|---|---|
| Usage: /304 | Internal only |
| Usage Notes: | None |
| Description: | Acronym for Fraud Management Filters, but used internally only. |
| Notes: | None |
| Related Terms: | Fraud Management Filters |
| Synonyms: | None |

⚠ Fraud Management Filters — 302

| | |
|---|---|
| Usage: /304 | Merchant only |
| Usage Notes: | You can use the filters on second reference. |
| Description: | Feature lets a merchant place a hold on transactions identified as potentially fraudulent. Do not confuse it with Fraud Protection Services, which is a feature of Payflow Gateway. |
| Notes: 306 | None |
| Related Terms: | FMF |
| Synonyms: | None |

⚠ Fraud Manager — 302

| | |
|---|---|
| Usage: /304 | Merchant only |
| Usage Notes: | None |
| Description: | Part of PayPal Manager. It lets Payflow Gateway users control their Fraud Protection Services. Both Basic and Advanced Fraud Protection Services feature a Fraud Manager tool that uses online wizards and detailed help to guide users through the set-up process. It is not related to the PayPal feature, Fraud Management Filters. |
| Notes: | None |
| Related Terms: | None |
| Synonyms: | None |

*FIG. 3*

TERMINOLOGY MANAGEMENT DATABASE

BACKGROUND

1. Field of the Invention

The present invention generally relates to terminology databases.

2. Related Art

Within a company, there may be specific terms (i.e., terminology) used to describe the company. This includes descriptors about services and goods offered by the company, requests to users, such as entering specific user information, internal information for use by different areas of the company to perform tasks or to obtain a better understanding of other areas of the company, commonly used acronyms, and terms to be used by third party developers, partners, or designers to create applications or other content for the company. With all the ways that different words or phrases can be used to describe something, different areas of the company may use different words or phrases to describe the same thing. This may even be more likely with third parties outside the company. Many disadvantages or problems to the company may result.

For example, if different terms are used within a company website to describe the same thing, the user may become confused or view the site in a negative way due to the lack of consistency and could result in increased customer contact and customer service costs for the company. Improperly used descriptors may be used that could cause legal issues for the company, such as when a certain term or phrase used in a particular context may give rise to an unintended legal obligation for or legal statement by the company. Another area of concern is with companies that have constantly new or emerging areas, with associated new descriptors. Other areas of the company may be unaware of this and misinterpret or misuse these new descriptors. In addition, outdated terms may be inappropriate descriptors for new or re-named products and services. Such terms should be avoided, which may not accurately describe the products or service or imply an older product or service is still available or applicable. Words that are slang or commonly used internally may also be inappropriately used as descriptors.

Yet another area that could be improved is translating or defining terms or phrases. Translation is very costly. The more time linguists have to spend researching terms, the more it costs. Also, if terms or phrases have to be retranslated, then cost increases. Outside translators may not fully understand the company's business, which may result in too general a translation, an inaccurate translation, and/or high costs to provide an accurate translation.

Therefore, a need exists for managing terminology used by a company that overcomes the disadvantages above.

SUMMARY

According to one embodiment of the disclosure, a company electronic database is maintained and updated that is searchable by word or phrase, as well as alphabetically or temporally (i.e., by most recently added terms, most popular terms, etc). The database includes commonly used and misused terminology associated with the company. Note that terminology, as used herein, may refer to a single word, an abbreviation, an acronym, multiple words, phrases, or even sentences or paragraphs. Within each terminology, the user of the database is provided with information about the terminology. In different embodiments, the information includes an indication whether the terminology is acceptable to use and in what situations or descriptions, notes on proper or improper usage, a description of the terminology, general notes, related terms, acceptable/unacceptable use of the term in a certain country or countries, and/or synonyms. The information could also include the term translated into different languages (as approved by legal, etc). If a terminology is not found, it can be added to the database, such as by an administrator after receiving information from a user and discussions with relevant others, like managers in the area and legal counsel. The database could be used to train new employees, for product documentation (e.g., functional specifications, and product requirement documents). A URL may be provided to the database to help keep the documents concise instead of defining the term in the document.

As a result, users of the database can determine if a certain terminology is acceptable to use, and if not, what are possible acceptable options. Users can also easily look up and understand new terminology from within the company, such as other groups or divisions or new employees. In addition, the database may be used check the acceptability of a phrase or description that may contain a large number of words. By submitting the description, the database can be used to determine if any words or phrases are not to be used or only to be used in certain descriptions. The user can then modify the description as needed based on the results. Users of the database may be employees of the company, third party developers submitting applications or content for the company, and the like.

In other embodiments, such a database may be used for other purposes. For example, a database may be set up and maintained with words and phrases that are unacceptable or may be problematic for use in a specific situation or site, such as postings on social networks, blogs, work emails, etc. The user can then submit a proposed posting for the database to check. The user may then revise or modify the proposed posting based on results of the check. Consequently, the user may be able to prevent posting content that would have caused problems for the user. In another example, a database may be populated with well-known passages, content, and phrases from copyrighted materials, such as books, movies, articles, websites, etc. A user can then check content to determine whether any of that content is from a known source. This may be okay if that content is quoted and its source identified, but may be problematic if there are indications of plagiarism, either intentional or inadvertent.

In other embodiments, the database may be used for more efficient and accurate translations by reducing the amount of research time and duplications, resulting in lower translation costs. For example, "forbidden" or "do not use" terms may be valuable information for the translation. Showing the different countries that use a term and the related terms and/or synonyms in other countries will help translators understand the meaning of a term more quickly. The database is easily exported to an excel spreadsheet, which is then easily imported to translation software and vice versa. Definitions will help translators understand the meaning of a word and how it should be translated when the context is ambiguous (e.g., the word "claim" might mean to accept a payment or to make a complaint). The database may also help translators distinguish and confirm correct usage. Consequently, translators not familiar with the company will be able to provide translations more accurately and at a lower cost. By providing login access to vendors and controlling the information that they see, the company can provide necessary information for the project, but not expose information about the company that is not needed or confidential.

These and other features and advantages of the present invention will be more readily apparent from the detailed description of the embodiments set forth below taken in conjunction with the accompanying drawings.

BRIEF DESCRIPTION OF THE FIGURES

FIGS. 1A-1D show exemplary results from different word searches according to one embodiment;

FIG. 2 shows an exemplary result from a multiple word search according to one embodiment;

FIG. 3 shows an exemplary result from a letter search according to one embodiment;

FIG. 4 is a block diagram of a networked system using terminology database according to one embodiment;

Figure 5:
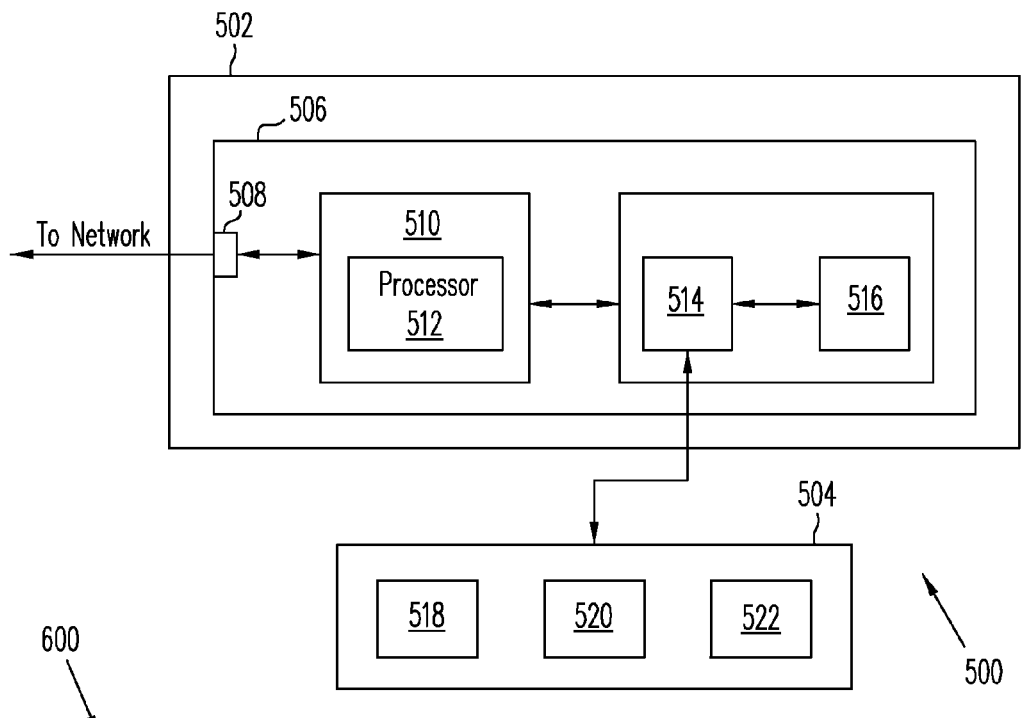
FIG. 5 is a more detailed block diagram of a server and database in FIG. 4 according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

FIGS. 1A to 1D show the results of different word searches of a terminology database according to one embodiment. In FIG. 1A, the user searches for all words and phrases that include the word "cash." The resulting display 100 lists three words or phrases 102. Note that both single and multiple words are shown. Display 100 also includes a visual indicator 104 that gives the user a quick and easy to identify symbol of whether the word or phrase 102 is acceptable to use, not acceptable to use, or should only be used in certain situations or with caution. Examples of such symbols may be a check mark, an "X," and an exclamation point, respectively. These symbols may also be colored for additional ease of identification, such as green, red, and yellow, respectively.

Each word or phrase 102 may include additional information to help the user. In this embodiment, the additional information includes a usage 106, usage notes 108, a description 110, notes 112, related terms 114, and synonyms 116. Different, additional, or less information may also be utilized, depending on the system or company maintaining the terminology database. Usage 106 lets the user know if it is okay to user the terminology, not okay to use, or okay to use in certain situations or use caution when using. Usage notes 108 provides the user additional details as to the usage of the terminology. For example, for the word "cash," usage notes 108 inform the user that there are only three acceptable uses of the word. Acceptable countries or regions in which the terminology may be used or should not be used can also be included in usage notes 108 or as a separate heading. Usage notes 108 can also provide the user suggestions of alternative acceptable terminology, such as shown for the terminology "cashback." Here, "cash back" as two separate words should be used instead of a single word.

Description 110 can be used to describe the meaning of the word or phrase, notes 112 can be used to give the user any other information about the terminology, related terms 114 lists terminology that is related to the word or phrase, and synonyms 116 lists terminology that has the same or nearly the same meaning as the word or phrase. For example, for the terminology "cash back," "cashback" is shown as a synonym 118, which may also be an active link. Thus, by clicking on the link, the user can be directed to a page that provides more information about the synonym. Other examples of these will be provided in the figures below.

FIG. 1B shows an example of a display 120 resulting from a search of the word "verification." Of note is that the user is told not to use "address verification" and is given an acceptable alternative of "confirm your address." Reasons are provided as well for the benefit of the user, such as the phrase is "jargon" and could be confused with another process. Links are provided for "confirm your address" as a synonym and within usage notes and for "confirm" as a related term.

FIG. 1C shows an example of a display 122 resulting from a search of the term "BML." As indicated, the term should not be used, an acceptable term provided, and a description of the term. This provides the user an easy way to find out of a proposed terminology is acceptable, details about it, and suitable alternatives.

FIG. 1D shows an example of a display 124 resulting from a search of the term "verify." Here, the search turned up no results in the terminology database. However, the user is provided a link to add that term to the database (called "Lingo" in the example). When the link is selected, the user may be presented with fields where the user can enter information. The fields may be the same ones as in the prior examples, e.g., fields 106-116. Word 102 may be automatically populated with the term, and visual indicator 104 may be automatically added once usage 106 is approved.

To maintain control and accuracy of any newly submitted terminology, the populated page may be sent to an administrator, who then reviews the content. The review process may involve program or section managers of the areas where the terminology is being or proposed to be used, as well as legal counsel. Once approved, with or without revisions, the database is updated with the new terminology and made available to users with access to the database. In this way, the database is dynamic and can be kept up to date, which is especially important in companies that experience growth and/or change.

FIG. 2 shows an example of a display 200 resulting from a search of the terminology "federal tax." The display shows one entry of "federal tax ID," which is not to be used. However, related terms of "EIN" and "Employee Identification Number" (also a synonym) are provided, which may be an acceptable alternative.

FIG. 3 shows an example of a display 300 resulting from a search of the all entries starting with the letter "F." Five entries are shown, with fields as previously described. Note that the terms "FMF," "Fraud Management Filters," and "Fraud Manager" all have a visual indicator 302 of caution or selective use, as opposed to earlier seen indicators of okay to use (check mark) or do not use (X mark). A written indicator for usage 304 lets the user know how the terminology may be used. For example, "FMF" is only intended for internal use, while "Fraud Management Filter" and "Fraud Manager" are only intended for merchant use. A description field 306 provides additional information about the term like an explanation of the restricted or cautioned use.

Note that the same word, phrase, or terminology may have different meanings and usages for different companies. Thus, depending on the terminology database searched, a user may see different descriptions and use requirements. Therefore, the terminology database is used specifically for the company or entity and not for general use or definitions like a dictionary or encyclopedia. As a result, companies can customize the language in the database specific to the company's needs and services.

FIG. 4 shows a network system 400 using a terminology database according to one embodiment. System 400 includes a computer 402 having a display 404 and a keyboard 406. A user may enter a term for searching in the terminology database through keyboard 406. Note that computer 400 may be any computing device, including a smart phone, PC, laptop, or the like, and keyboard 406 may be any data entry means, including a virtual keyboard. Computer 400 is connected via a network 408 to a database server 410 which provides access to a terminology database 412. One or more computers 414 may also be in communication through network 408, such as operated by an administrator of database 412. Database 412 stores the company's terminology for use by users, administrators, and others as needed. In one exemplary use, a user, such as an employee or developer, access database 412, e.g., through a company URL or intranet, and enters a terminology on keyboard 406, which is shown to the user on display 404. If accurate, the user submits the terminology for searching in database 412.

The request is communicated through network 408, where the search is performed in database 412 through server database server 410. The results, examples of which are shown above, are presented to the user on display 404. If the terminology requested is not found in database 412, the user may submit information for the terminology to be added to database 412. In that case, an administrator or other person or entity, is notified and can view the submission through computer 414. Once approved (with or without revisions), the information can be added to database 412 through database server 410.

FIG. 5 is a more detailed block diagram 500 of a server 502 and a database 504, which can be used in the system of FIG. 4, according to one embodiment. Server 502 is in communication with a network (such as network 408 in FIG. 4). The network may be any suitable wired or wireless communication network, such as a LAN (Local Area Network) or a WAN (Wide Area Network) having a plurality of LANs connected via bridges, routers, etc. Communication between a user device (such as computer 402 of FIG. 4) and server 502 may be established by TCP/IP (transmission control protocol/Internet protocol). Server 502 includes a database management system (DBMS) server process 506 operating thereon, which is connected via a port 508 to the network. DBMS process 506 may also include an executing entity control daemon 510, which a microcontroller or processor 512.

DBMS server process 506 may also includes a database (DB) access executing entity 514 which is created when a database access request is received via processor 512, and resources 516 which is allocated to database access executing entity 514. Database access executing entity 514 communicates with database 504, which may include a storage device 518 for storing log data, a storage device 520 for storing database files each storing data, and a storage device 522 for storing meta data for controlling data of the database, all of which may be computer-readable. DBMS server process can provide instruction threads as units of execution in response to respective requests of the user. Examples of storage and computer readable media include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

Figure 6:
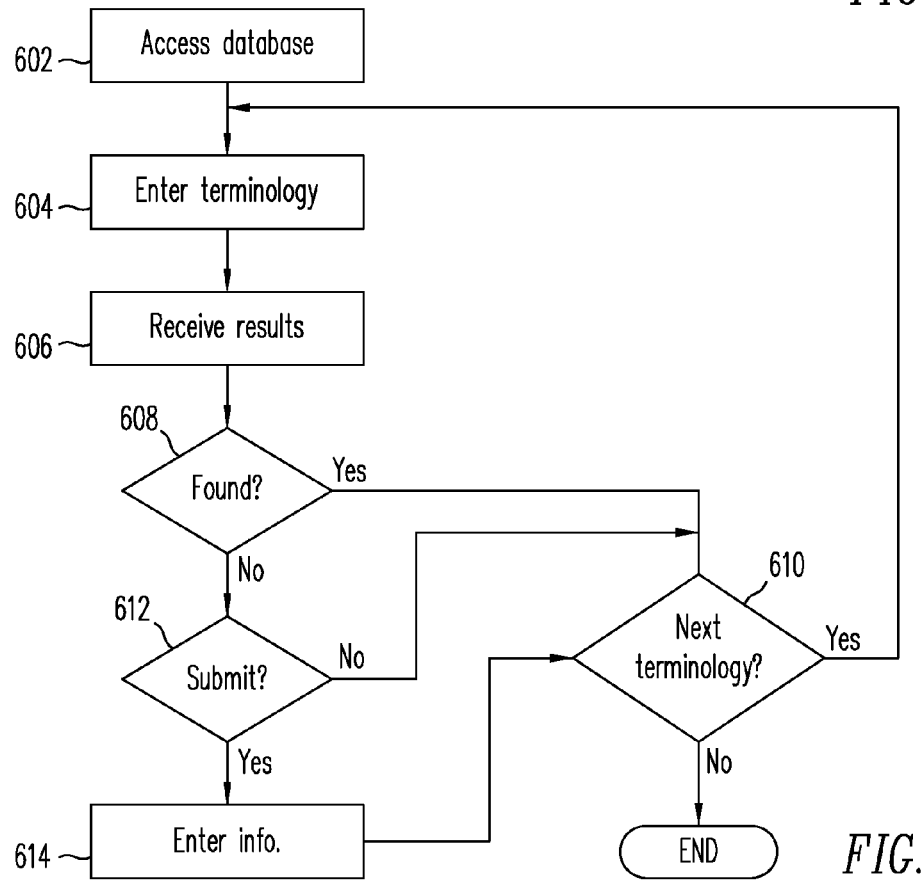
FIG. 6 is a flowchart showing steps in using a terminology database according to one embodiment.

FIG. 6 is a flowchart 600 showing steps in using a terminology database according to one embodiment. At step 602, the user access the terminology database. The user may be someone employed by or associated with the company or entity managing the database. Examples include any employee of the company, such as new employees, managers, and editors/writers in charge of publishing content for the company, third party developers or affiliates who create applications or other content associated with the company, and contractors. The user may also be a user of a web site of the company, such as a social network or chat board. The user may also be someone checking the work of others. An example of this is a teacher checking if a student submitted a paper that plagiarized other sources.

The terminology database may have different levels of access or a single level of user access. In one embodiment, the user may access the database by signing up through the site or simply entering the company site. This type of access may be a read-only access in which the user may not submit or edit information. Such users may be the general public seeking additional information about the website or company. Another type of access may require the user to enter a user name and/or password, which may only be given to users the company allows to use the database. Even with this type of restricted access, there may be different access levels once the database is initially accessed. For example, regular or general employees may be given one type of access, program managers another level, and database administrators yet another level. Available content may also be different depending on the user or access level.

The user may access the database through any suitable means, such as, but not limited to, a smart phone, PC, laptop, PDA, or computing device communicating through a network, such as, but not limited to, a LAN, WLAN, PTSN, or various other wired or wireless networks, including telecommunications, mobile, and cellular phone networks. Access may be performed through key entry or even voice.

Once the user accesses the database, at step 604, the user enters a word or words, a phrase, a sentence or even more (collectively referred to herein as "terminology"). Entry can be in the same way as accessing the database, e.g., key entry or voice. After entry, the terminology is communicated and searched in the database. Different search methodologies, known in the art, can be used. It is also noted that entry of the terminology can be done with any suitable known search methods, such as wild cards, quotation marks, Boolean, and standard basic and advanced search methods.

After the searching is completed, the user receives the results of the search at step 606. In one embodiment, the results, examples of which are shown in FIGS. 1-3, are provided to the user on a display from a user device. The results may be a list of one or more found items or an indication that the terminology was not found in the database. If the terminology was found, as determined at step 608, the user sees information about the one or more displayed terminologies for use as needed. Examples of the use can be purely informational, confirming or revising content, or checking submitted content for acceptability, such as on blogs or social networking sites, plagiarism, or other purpose. After the user is finished, the user may enter another terminology or end the search session, as determined at step 610.

If, as determined at step 608, the terminology was not found in the database, the user may submit the new terminology, search for another terminology, or end the session. The system can keep track of searches that have no results. Therefore, missing terms that may be needed or have a lot of search requests may be identified and added. Similarly, the system may be able to keep track of how often each term is viewed, so that popular terms over a certain time period can be identified.

If, as determined at step 612, the user wishes to submit information about the new terminology, the user may do so at step 614. In one embodiment, the user is presented with a page having fields that the use can enter information into. Examples of fields are shown in FIGS. 1-3. Depending on the terminology database, different fields, a larger number of fields, or a smaller number of fields may be used or presented to the user. The user enters the requested information and submits the information to the database. The information would stored in a pending state, not publicly available, but available for review by users with this specific access. A review may be performed for accuracy and compliance with any company or legal policies. Thus, the information might be reviewed by one or more administrators or personnel. For example, program managers may review to determine whether the terminology is acceptable for use in describing services or other content within the program, legal counsel may review to determine whether the terminology is legally acceptable, and marketing personnel or editors may review the usage and other descriptors of the terminology to determine whether the use is proper.

Once the terminology has been reviewed and revised as needed, the new terminology may be approved and stored in the database for public use. Note that in some embodiments, a user or users may be given the access to update the database in real-time without any approval process or administrators, such as in a blog or wiki type environment.

Thus, using such a terminology database, users may access specific terminology of a company or website for a better understanding of company or website. Users may also use the database to write acceptable content for the company or website by checking whether certain terminology is acceptable for use and conditions for such use and whether whole passages or sentences contain a word or words that are not be used or only to be used in certain situations. Another use of the database is by users wanting to check whether a posting by the user on a blog or social networking site might be problematic. Still another use is by teachers and other personnel to check if a submitted content contains plagiarized material. Because the terminology database is specific to the use and company maintaining it, the database can be made very specific, as opposed to general databases like dictionaries and encyclopedias, resulting in a more focused and potentially valuable resource for the user.

Where applicable, various embodiments provided by the present disclosure may be implemented using hardware, software, or combinations of hardware and software. The various hardware components and/or software components set forth herein may be combined into composite components comprising software, hardware, and/or both without departing from the spirit of the present disclosure. Also, where applicable, the various hardware components and/or software components set forth herein may be separated into sub-components comprising software, hardware, or both without departing from the scope of the present disclosure. In addition, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, certain use cases have been described for a terminology database, but other uses are also contemplated with a database that allows users to search, check, and possibly submit information using words, phrases, or paragraphs. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory storing terminology and meanings of the terminology; and
one or more hardware processors configured to perform a method comprising:
receiving a search term from a user, the search term being received from the user as a portion of textual content;
searching a terminology database for the search term, wherein the terminology database comprises a plurality of company-specific terminology and information about each of the company-specific terminology, and wherein the search term is a correctly spelled word or phrase and is part of the company-specific terminology;
determining that the search term is not acceptable for an intended use of the textual content; and
providing results from the searching to the user, wherein the results comprise at least one approved term to use instead of the search term, the search term, a description of a meaning of the search term, and a positive indication of a company-approved scope of usage associated with the approved term and defining a permissible audience for the textual content.

2. The system of claim 1, wherein the positive indication of the company-approved scope of usage comprises an indication that the search term is permitted for internal use only, for merchant use only, or in specific countries or regions.

3. The system of claim 2, wherein the positive indication comprises a mark.

4. The system of claim 1, wherein the information comprises a description of the search term and usage notes.

5. The system of claim 1, wherein the search term comprises a word, a plurality of words, or a sentence.

6. The system of claim 1, wherein the search term comprises a plurality of sentences.

7. The system of claim 1, wherein the user comprises an employee of the company.

8. The system of claim 1, wherein the method further comprises receiving information about the search term from the user if the search term is not found in the terminology database.

9. The system of claim 8, further comprising adding the search term and information about the search term to the database if the search term and the information are approved.

10. The system of claim 1, wherein determining that the search term is not acceptable comprises determining that the search term in not acceptable except in a limited scope of usage.

11. The system of claim 1, wherein the terminology database is accessible only by employees of the company.

12. The system of claim 1, wherein the search term is for an intended use on a social network site and the results indicate to the user whether the search term is acceptable for the intended use.

13. The system of claim 1, wherein the search term comprises a plurality of words and the results indicate whether the search term includes plagiarized content.

14. A non-transitory machine-readable medium comprising a plurality of machine-readable instructions which when executed by one or more processors of a server are adapted to cause the server to perform a method comprising:
receiving a search term from a user, the search term being received from the user as a portion of textual content;
searching a terminology database for the search term, wherein the terminology database comprises a plurality of company-specific terminology and information about each of the company-specific terminology, and wherein the search term is a correctly spelled word or phrase and is part of the company-specific terminology;
determining that the search term is not acceptable for an intended use of the textual content; and
providing results from the searching to the user, wherein the results comprise at least one approved term to use instead of the search term, the search term, a description of a meaning of the search term, and a positive indication of a company-approved scope of usage associated with the approved term a defining a permissible audience for the textual content.

15. The non-transitory machine-readable medium of claim 14, wherein the positive indication of the company-approved scope of usage comprises an indication that the search term is permitted for internal use only, for merchant use only, or in specific countries or regions.

16. The non-transitory machine-readable medium of claim 15, wherein the positive indication comprises a mark.

17. The non-transitory machine-readable medium of claim 14, wherein the information comprises a description of the search term and usage notes.

18. The non-transitory machine-readable medium of claim 14, wherein the search term comprises a word, a plurality of words, a sentence, or a plurality of sentences.

19. The non-transitory machine-readable medium of claim 14, wherein the method further comprises receiving information about the search term from the user if the search term is not found in the terminology database.

20. The non-transitory machine-readable medium of claim 19, wherein the method further comprises adding the search term and information about the search term to the database if the search term and the information are approved.

21. The non-transitory machine-readable medium of claim 15, wherein the determining that the search term is not acceptable comprises determining that the search term in not acceptable except in a limited scope of usage.

22. The non-transitory machine-readable medium of claim 14, wherein the terminology database is accessible only by employees of the company.

23. The non-transitory machine-readable medium of claim 14, wherein the search term is for an intended use of a user on a social network site and the results indicate to the user whether the search term is acceptable for the intended use.

24. The non-transitory machine-readable medium of claim 14, wherein the search term comprises a plurality of words and the results indicate whether the search term includes plagiarized content.

* * * * *